United States Patent [19]

Brewer, Jr.

[11] 4,396,343
[45] Aug. 2, 1983

[54] BOAT HANDLING APPARATUS

[76] Inventor: Clair H. Brewer, Jr., Cleveland, Ohio

[21] Appl. No.: 283,390

[22] Filed: Jul. 15, 1981

[51] Int. Cl.³ .................................................. B63C 13/00
[52] U.S. Cl. .................................... 414/678; 114/344;
 280/47.13 B; 414/462; 414/758
[58] Field of Search ............... 414/419, 421, 462, 678,
 414/758, 763, 783; 280/47.13 B, 47.32, 414.1,
 414.2; 114/343, 344

[56] References Cited

U.S. PATENT DOCUMENTS

| 1,220,640 | 3/1917 | Kelly | 414/421 X |
| 2,551,040 | 5/1951 | Newell | 114/344 X |
| 2,624,591 | 1/1953 | Choplin | 114/344 X |
| 2,963,184 | 12/1960 | Graef | 414/462 |
| 3,072,274 | 1/1963 | Atwell | 414/462 |
| 3,565,271 | 2/1971 | Deck | 414/462 |
| 3,857,128 | 12/1974 | Gilster | 114/344 |

FOREIGN PATENT DOCUMENTS 2704025 8/1978 Fed. Rep. of Germany ... 280/47.32

Primary Examiner—Leslie J. Paperner

[57] ABSTRACT

Devices for removable attachment to the transom of a boat to facilitate raising the boat onto the top of a vehicle or removing the same therefrom and a wheeled device associated therewith adapted for launching the boat into the water and for pulling the boat out of the water.

4 Claims, 7 Drawing Figures

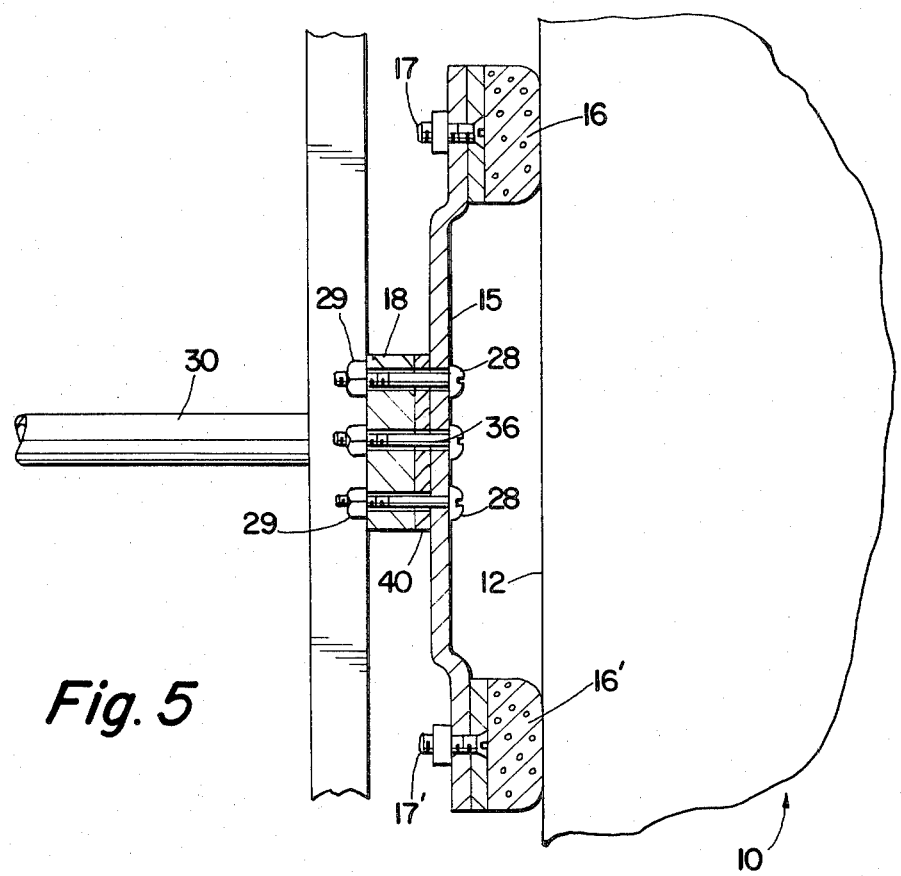
Fig. 5
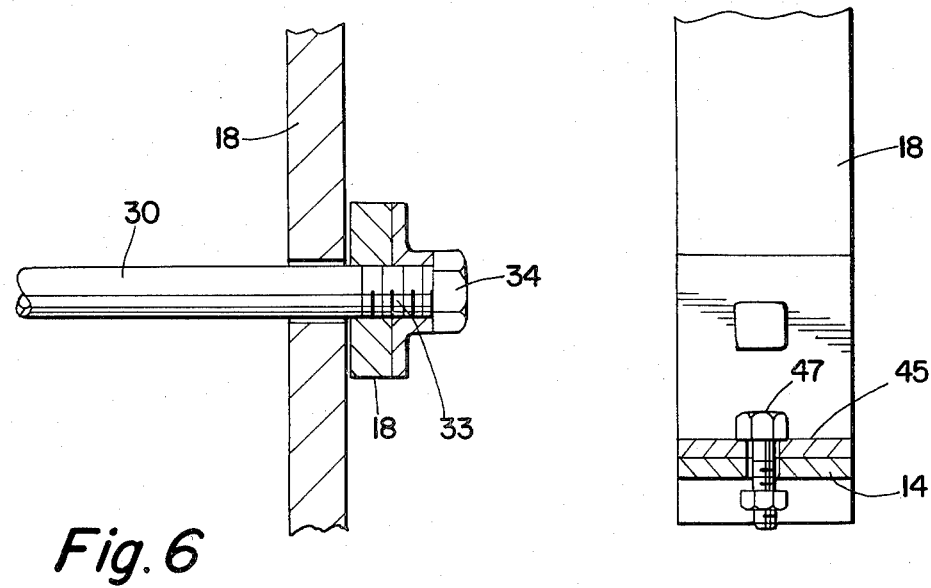
Fig. 6
Fig. 7

BOAT HANDLING APPARATUS

The invention relates to boat handling apparatus and particularly to apparatus adapted to be detachably secured to the transom of a boat which, when attached, is adapted to enable the boat to be rotated to an inverted position and placed on top of a wheeled vehicle such as an automobile and to be removed therefrom to relieve considerable strain and effort in the manual handling thereof during rotation thereof.

Removable attachments have been secured to boats for launching the carriage of the same and for maneuvering the boat about on land. Examples of such carriers are disclosed in U.S. Pat. Nos. 2,551,040 dated May 1, 1951; 2,624,591 dated Jan. 6, 1953; 2,792,232 dated May 14, 1957; 3,857,128 dated Dec. 31, 1974 and 3,697,096 dated Oct. 10, 1972. Boats of the type and size normally handled by such apparatus are generally lifted by several persons and such boats normally have a transom at the stern end for mounting an outboard motor. These boats are frequently transported on the top of a vehicle. Upon arrival of the automobile at the launching site or storage location, the boat usually is lifted off the automobile and then transported to the launching or storage location. The boats are frequently heavy and require more strength in removing the same than is sometimes available. The boat must be manually held by a person at either end and manually lifted onto the top of the automobile or off of the same and the weight of the boat is an overhead weight during the greater portion of the period of removal or securing of the same to the top of an automobile or other vehicle.

The present invention provides means to assist in such mounting or dismounting of the boat from the automobile and to relieve the weight imposed upon the operator or the operator and his assistant. The boat can be rotated around its longitudinal axis, can be rotated sideways and around and is adapted to be rotatably secured to a dolly which can serve additionally for maneuvering the boat when it is removed from the top of the automobile, and for launching of the boat.

The invention contemplates that the dolly or wheeled member with which the apparatus of the invention is associated may be removed therefrom and that the means for rotating the boat which are adapted to be associated with the transom may be removed from the transom fittings and that both may be separately carried within the interior or trunk of the automobile.

An object of the invention therefor is to provide means so designed and constructed as to enable a boat to be detachably mounted on transport or brace means so that it can be easily rotated into position for mounting on a vehicle or removed from its carriage thereon.

Still a further object of the invention is to provide means for rotating a boat which means is adapted to be secured to existing transom fittings as for example, rudder fittings.

Another object of the invention is to provide a boat handling device which is composed of but few parts, readily attached to existing fittings on the boat, inexpensive in manufacture and highly efficient in use.

Other objects of the invention and the invention itself will become more readily apparent from a purview of the appended specification and claims, in which reference is made to the accompanying drawings, in which:

FIG. 3 is a sectional view of the rotation device taken on the line 3—3 of FIG. 1;

FIG. 4 is an enlarged view of a portion of the rudder mounting attachment of the rotation device of FIGS. 1-3;

FIG. 5 is an enlarged view taken on the line 5—5 of FIG. 3;

FIG. 6 is an enlarged view taken on the line 6—6 of FIG. 3;

FIG. 7 is an enlarged view taken on the line 7—7 of FIG. 3.

Figure 1:
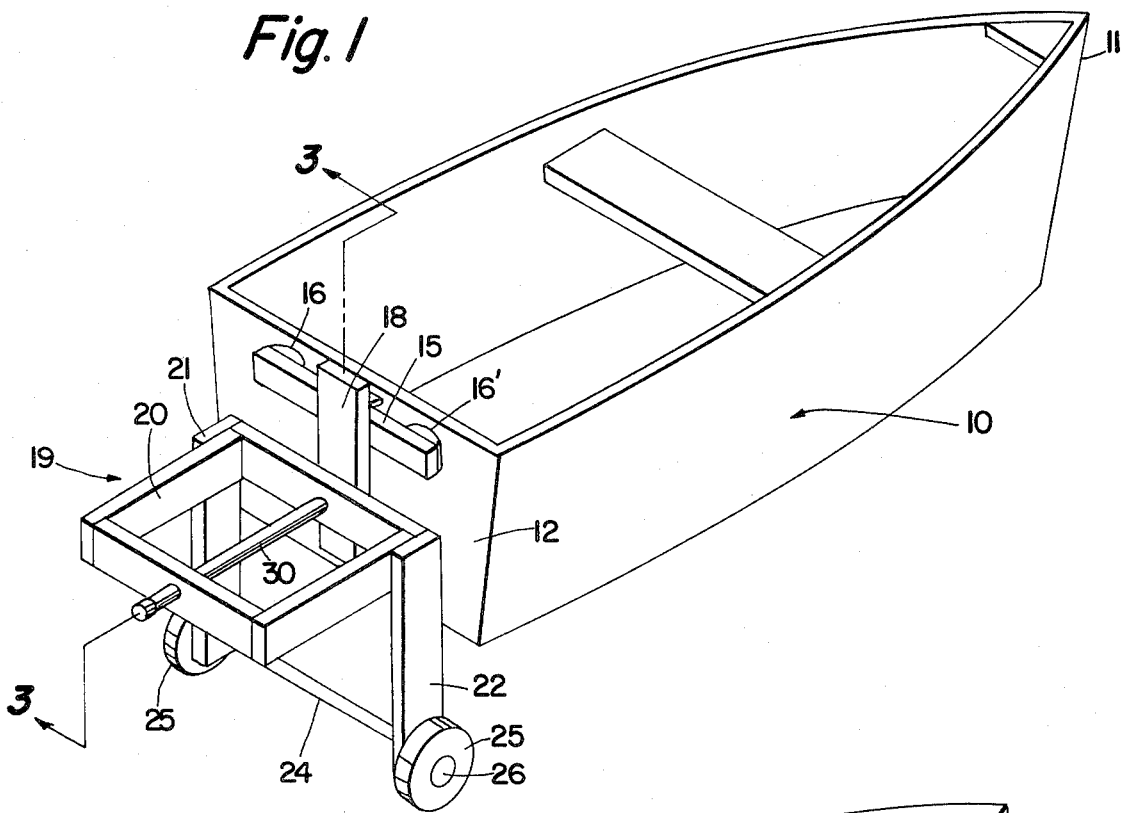
FIG. 1 is a perspective view of the boat in upright position and rotation means therefor, which means is mounted on the stern rudder brackets and rotatably associated with a transport dolly in one form of my invention.
Figure 2:
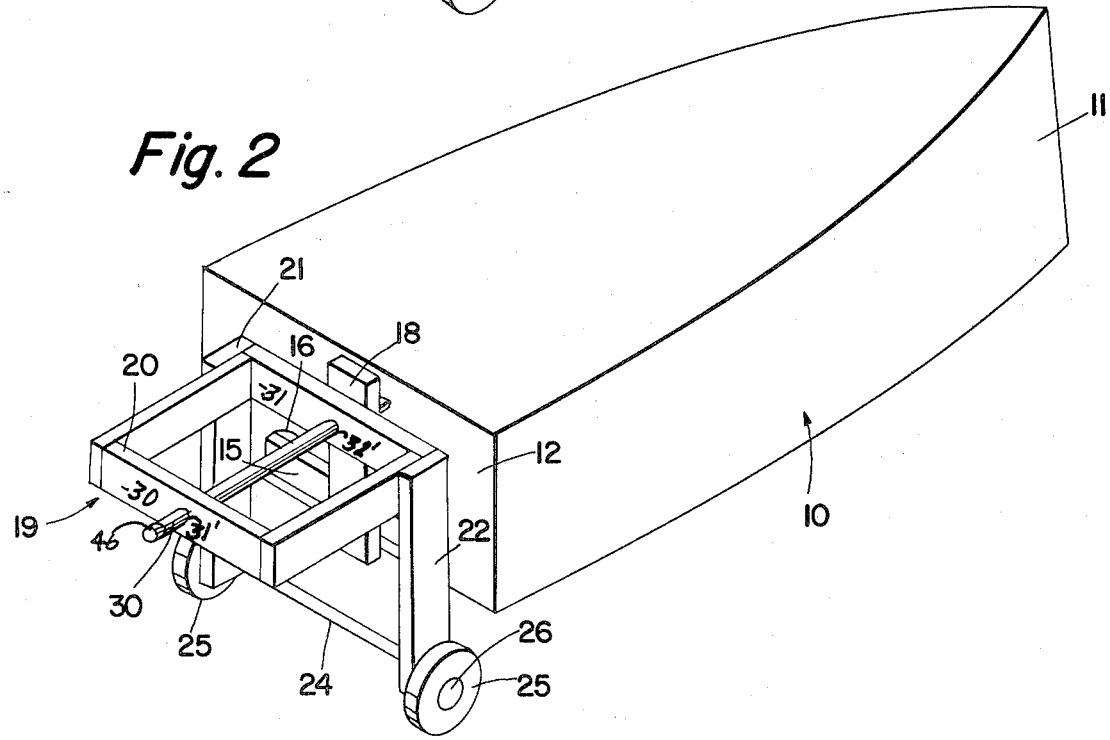
FIG. 2 is a view similar to that of FIG. 1 showing the boat rotated 180° in an inverted or upside down position.
Figures 3, 4:
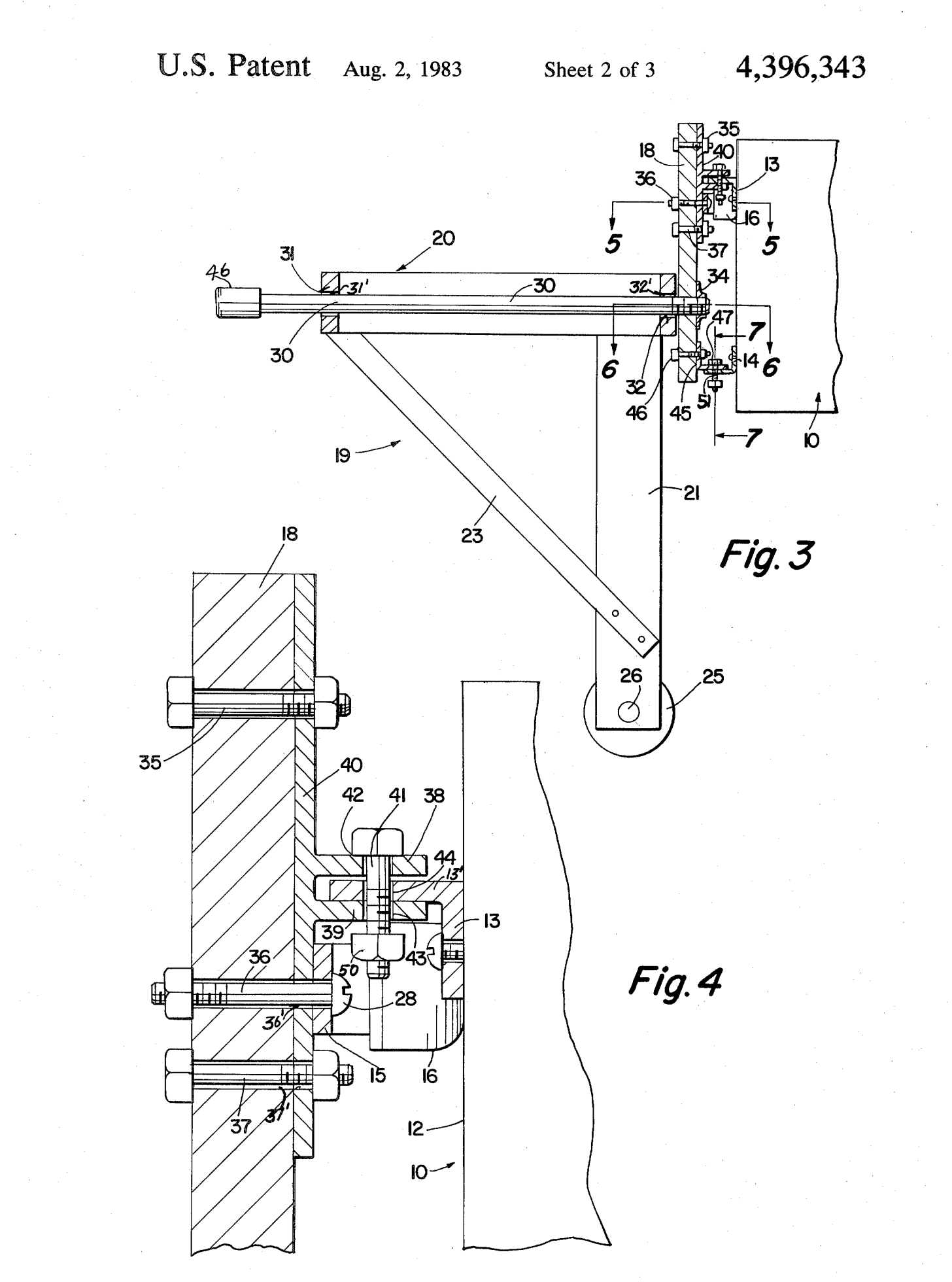

Referring now to the drawings, in all of which like parts are designated by like reference characters, A boat or small aquatic vessel as indicated at 10 is shown in FIG. 1 with its prow or bow 11 in upright position and its prow in FIG. 2 in inverted position. In the form of the invention illustrated, a dolly or wheel carrier is shown at 19 disposed rearwardly of the stern or transom 12 of the boat for supporting the boat in an elevated position and provided with rectangular frame means 20 on which rotatable means 30 are mounted, which rotatable means are secured to vertical means 18 affixed to the stern or transom 12 for rotation of the boat 10 about its center line. The dolly 19 comprises the rectangular frame 20 and a pair of spaced uprights 21 and 22. The lower ends of the said uprights preferably are provided with openings therethrough (not shown) adapted to act as journals for an axle 24 on which a pair of wheels 25 are mounted. The rotatable means 30 shown consists in an elongated rotatable rod adapted to be disposed through aligned openings 31' and 32' in the rearmost and most forwardly spaced parallel frame members 31 and 32, as best illustrated in FIG. 3 and secured to the boat at its foremost end by the vertical means 18.

It will be noted that the elongated rod 30 is preferably provided with a handle 46 at its rearmost end and at its foremost end provided with a threaded end secured by fastening means 34 to the vertical upright 18 secured to the transom or stern 12 of the boat 10 on fittings such as rudder fastenings or the like provided thereon. The rudder fittings shown comprise a pair of spaced L-shaped channel members 13 and 14 which are inversely positioned relative to each other and secured centrally of the stern 12 in line with the central axis or center line of the boat, as shown in FIGS. 1 and 2. The fittings are adapted normally to act as attachment means for the rudder which is not shown and is removed from its mounted position on the boat during transport of the boat. The said fittings with the rudder removed hence are adapted to have the rotatable means mounted thereon for positioning the boat in inverted or erect position as desired for placement on or removal of the same from a transport vehicle. Where rudder fastenings are not available, as in the case where an outboard motor is used with the boat, the rotatable rod is fastened to the stern by either independent fastening means or other preferred means.

L-shaped brackets, shown at 13 and 14, are attached in spaced relation to the transom as by screw means, etc. The leg 13' of the bracket 13 is provided with an aperture therethrough. A plate 40 overlies the outer face of the vertical upright 18 and is secured thereto as by bolts 35, 36 and 37. The plate 40 is provided with a pair of spaced legs 38 and 39 integral therewith and projecting outwardly of the same and are provided with aligned apertures 42 and 43 respectively. The apertures 42 in the leg 38, 44 in the leg 13, and 43 in the leg 39 are aligned, as best shown in FIG. 4, and a headed bolt 41 is disposed therethrough and fastened as shown by a nut 50 to the upright 18 whereby the upright is secured to the stern or transom centrally thereof. At its lower end, the upright 18 is secured by a bolt 46 to an L-shaped bracket 45 secured in turn by bolt means 51 to the bracket 14 secured to the lower portion of the stern. A bolt 36 is adapted to be projected through aligned openings 36', 37' and 37'' in the upright 18, the plate 40 and a transverse member 15 to secure the transverse or cross bar 15 to the upright 18. The member 15 is disposed at the upper portion of the stern and at right angles as shown to the vertical upright 18 and is provided with bumper elements 16 and 16' at opposite ends thereof, which bumpers serve to maintain the rotatable means in secure engagement with the stern or transom 12 whereby the rotatable means 30 is maintained in the plane of the transom and rotates about a fixed axis in line with the center line of the boat. The bumpers are preferably made of rubber or other suitable material and are used to hold the rotating axis perpendicular to the vertical mid-plane of the boat or vertical to the keel.

Although in the embodiment of this invention disclosed herein, the rotatable means 30 is of cruciform shape, it will be understood that variations in the shape thereof, determined by the type of fastenings employed and other design considerations, may be made. It is essential however, that the rotatable means be in line with the center line of the boat and be adapted to be kept in fixed plane relationship thereto during the rotation of the boat which can be rotated up and down, sideways and around the center axis.

To place the boat on top of a transport vehicle or remove the same, it is preferable that the prow be manually supported during rotating effected by rotating the rod of which the rotatable means is an extension.

Although in the preferred embodiment illustrated herein, the dolley is shown having a generally rectangular specific type frame, I am aware that other type dolleys may be used for mounting the movable means. It is contemplated that the same, as well as the movable means, may be carried in the storage space, such as the trunk of the car, during transport of the boat, also that the dolley may be used to transport the boat, when removed from the roof of the car, to a desired location, etc. and thereafter detached from the boat.

Other variations may be made in the invention without however departing from the spirit of my invention or the scope of the appended claims.

What I claim is:

1. A device for rotating a boat about its center line comprising a dolly having a support frame provided with wheels, first means adapted to be detachably secured to rudder fittings and second means securely held in alignment with the center line of the transom or stern of the boat during rotation, rotatable means secured to the said second means mounted on the transom end of said boat and loosely journalled through the said dolly support frame, manual means secured to said rotatable means adapted to rotate the boat about its center line.

2. The rudder fittings for the first means of claim 1 being alternately employed as rudder fasteners upon removal of the said first means from said rudder fittings.

3. A device as claimed in claim 1 wherein the first means comprises a pair of members secured at right angles to one another, a first of said members detachably secured to the transom vertically of the stern in line with the center line of the boat and the second said member disposed at right angles to the first said member and adapted to abut the face of the transom and maintain the first said member in alignment with the center line of the boat during rotation.

4. A device as claimed in claim 1 wherein the dolly is adapted to aid in transporting the boat.

* * * * *